US006643293B1

(12) United States Patent
Carr et al.

(10) Patent No.: US 6,643,293 B1
(45) Date of Patent: *Nov. 4, 2003

(54) VIRTUAL CONNECTION SHAPING WITH HIERARCHIAL ARBITRATION

(75) Inventors: David Walter Carr, Nepean (CA); Denny L. S. Lee, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/200,444

(22) Filed: Nov. 27, 1998

Related U.S. Application Data

(63) Continuation-in-part of application No. 08/924,657, filed on Sep. 5, 1997, now Pat. No. 6,163,542.

(30) Foreign Application Priority Data

Sep. 4, 1998 (EP) .............................................. 98307144

(51) Int. Cl.[7] .............................................. H04L 12/28
(52) U.S. Cl. ..................... 370/399; 370/395.4
(58) Field of Search .............................. 370/230, 230.1, 370/389, 391, 395.1, 395.4, 395.41, 395.42, 395.43, 398, 399, 412, 413, 414

(56) References Cited

U.S. PATENT DOCUMENTS 5,694,121 A * 12/1997 Krause et al. ........... 340/825.5
6,011,775 A *  1/2000 Bonomi et al. ............. 370/230
6,163,542 A * 12/2000 Carr et al. .................. 370/399

OTHER PUBLICATIONS

J. Rexford, A. Greenberg, and F. Bonomi. Hardware–Efficient Fair Queueing Architecture for High–Speed Networks. 1996 IEEE. pp. 638–646.*

S. Fahmy, R. Jain, B. Vandalore, and R. Goyal. A Framework for Virtual Channel onto Virtual Path Multiplexing in ATM–ABR. 2000 IEEE. pp. 1724–1730.*

* cited by examiner

Primary Examiner—Chau Nguyen
Assistant Examiner—Keith M. George
(74) Attorney, Agent, or Firm—Marks & Clerk

(57) ABSTRACT

Apparatus and method for shaping ATM cell traffic emitted onto a virtual path connection in an ATM network are described. Component virtual channel connections are arbitrated at an aggregation point utilizing an arbitration technique. The technique provides both virtual path shaping and controllability of underlying virtual channel connections with an improved fairness performance amongst all the aggregating virtual channel connections.

6 Claims, 6 Drawing Sheets

VIRTUAL CONNECTION SHAPING WITH HIERARCHIAL ARBITRATION

RELATED APPLICATIONS

This application is a Continuation In Part of U.S. application Ser. No. 08/924,657 filed Sep. 5, 1997 now U.S. Pat. No. 6,163,542.

FIELD OF THE INVENTION

This invention relates to data communications networks utilizing ATM technology and more particularly to apparatus and methods for scheduling/shaping multi-service category cell traffic onto virtual-path connections while providing fair share arbitration between aggregating virtual channel connections.

BACKGROUND OF THE INVENTION

Asynchronous transfer mode (ATM) technology is rapidly being recognized as the technology of choice for broadband data communications. ATM cells having a fixed number of bytes can efficiently accommodate multimedia traffic such as video, voice and data.

ATM cell traffic between nodes in an ATM network is carried on what are known as virtual connections (VC). Traffic from end user to end user through a plurality of intermediate nodes is carried on virtual channel connections (VCC). A VCC on a particular link is uniquely identified by the combination of virtual path identifier (VPI) and virtual channel identifier (VCI) fields in the ATM cell headers. Since traffic from several sources may have a common destination it is known to combine virtual channel connections onto a virtual path connection (VPC) in order to simplify the processing of traffic through the network. A VPC on a particular link is uniquely identified by the VPI field in the ATM cell header. When virtual channel connections are aggregated onto a virtual path connection, the individual virtual channel connections are essentially transparent to the intermediate ATM nodes and this allows a simpler networking model and higher manageability.

A virtual path connection is defined as a logical grouping of multiple virtual channel connections into one virtual connection. An implicit logical aggregation of VCCs into a VPC is said to have occurred when the outgoing VCCs all acquire the same common VPI value. Typically, such aggregation occurs at the egress port of an ATM switch where multiple VCCs from multiple ingress ports converge. These aggregating VCCs might have different VPI and VCI values as determined at call setup or network planning time. The egress port of the ATM switch is typically equipped with a cell header translation function. Such a function is capable of translating the incoming VPI and VCI values into a new set of VPI and VCI values. It is this function that accomplishes the aforementioned implicit logical aggregation. When the various VPI and VCI values on the various aggregating VCCs all translate into a common VPI value, a virtual path connection is formed. Note that the VCI value is carried transparently end-to end within a VPC. It is, therefore, important for the translation function to translate the incoming VCI values into a mutually exclusive set of VCI values. Such mutual exclusivity allows each underlying VCC to be uniquely identified at the terminating end of the VPC. At that point, the VPC is segmented by simply switching and processing each underlying VCC as an individual connection. The combination of an egress aggregation function together with the ingress segregation function on a bi-directional port is referred to as the virtual path termination point (VPTP).

Although the aggregation of virtual channel connections onto a common path simplifies traffic management, concerns have been expressed that individual virtual channel connections may not all be treated fairly when aggregated onto a virtual path connection. Demirtjis and Petr (IEEE IC3N, 1995 "How to Encourage Cheating with Virtual Path Policing in ATM Networks") have found that virtual channel connections which are in compliance with predefined transmission parameters may be adversely affected by non-compliant traffic when aggregated onto a virtual path. U.S. Pat. No. 5,629,928 which issued May 13, 1997 to Calvignac et al discloses one technique for controlling traffic flow in a virtual path communication system wherein queues allocated as needed from a pool of free queues are used to store all incoming data cells having the same virtual channel identifier.

SUMMARY OF THE INVENTION

The present invention seeks to provide shaping of virtual path traffic through an ATM network utilizing an arbitration technique.

Therefore, in accordance with a first aspect of the present invention there is provided a device for scheduling virtual channel connections carrying cell traffic of different categories of service onto a virtual path connection comprising: aggregating means for aggregating virtual channel connections of similar categories of service into a single cell stream.

In accordance with a second aspect of the present invention there is provided, in an ATM data communications network utilizing virtual channel connections wherein the virtual channel connections are aggregated at an aggregation point onto virtual path connections, an apparatus for shaping ATM cell traffic comprised of various categories of service onto the virtual path connection, the apparatus comprising: queuing means for queuing cells from each of the virtual channel connections; arbitration means to arbitrate between the virtual channel connection traffic; and a virtual path connection shaper to determine egress emission time of cells from the arbitration means onto the virtual path connection.

In a preferred embodiment of this aspect of the invention virtual channel connections carrying the various categories of service, as defined by the ATM Forum, are queued separately. Like-service-category virtual channel connection queues are grouped into per-VC groups. An arbitration scheme arbitrates within each per-VC group and another arbitration scheme arbitrates between per-VC groups with like categories of service.

In accordance with a further aspect of the present invention there is provided in an ATM data communications network having virtual channel connections channel aggregated at an aggregation point onto virtual path connections, a method for fairly shaping ATM cell traffic comprised of various categories of service and quality of service parameters onto the virtual path connection, the method comprising the steps of: queuing the virtual channel connection cell traffic in separate queuing buffers; arbitrating between the separate queuing buffers utilizing an arbitration means; and shaping the arbitrated cell traffic with a virtual path connection shaper in order to fairly emit the cell traffic onto the virtual path connection.

In a preferred embodiment of this aspect of the invention the shaper determines the cell egress times in accordance with certain traffic descriptors.

BRIEF DESCRIPTION OF THE DRAWINGS

The invention will now be described in greater detail with reference to the attached drawings wherein.

DETAILED DESCRIPTION OF THE INVENTION

Known virtual path connection (VPC) aggregation is typically performed at the egress direction of an ATM switch. Such VPC aggregation points do not usually have VP level shaping capability and, therefore, the aggregated cell stream cannot be policed in downstream nodes. Other VPC aggregation points may have per-VC shaping capability, therefore the VP must first be aggregated before it is shaped. This method does not allow controllability of the underlying VCCs at the VP aggregation point. These controllable elements include such items as per-VC buffer management, rate-control and fairness amongst aggregating VCCs.

Figure 1:
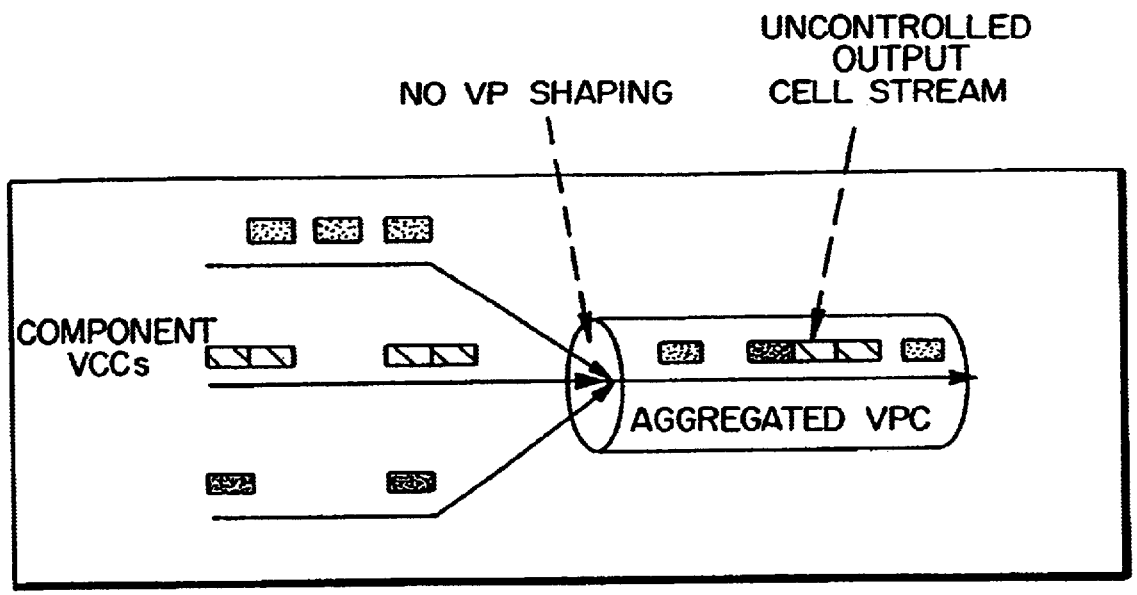
FIG. 1 is one prior art method of forming a virtual path connection at an aggregation point.

FIG. 1 illustrates a logical aggregation at a VPC aggregation point. As shown, the component VCCs are multiplexed onto the virtual path connection without any virtual path shaping. This results in an uncontrolled output cell stream which is unlikely to provide fair sharing of the virtual channel connection cells. Without shaping, the aggregated VPC traffic is likely to include irregular flow.

Figure 2:
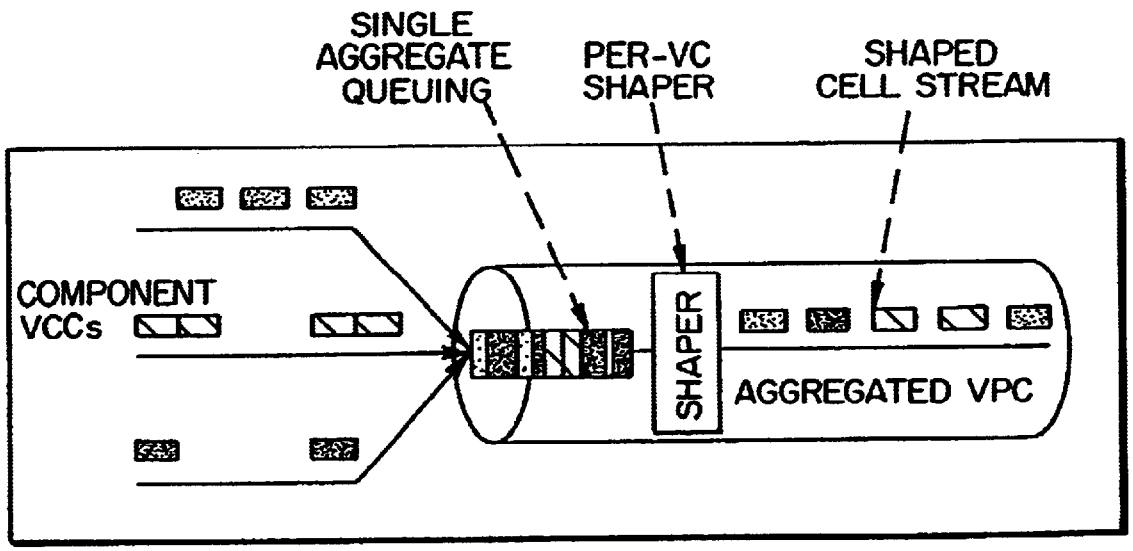
FIG. 2 represents a second prior art method of forming a virtual path connection at an aggregation point.

FIG. 2 illustrates a VPC aggregation point with shaping after aggregation. As in FIG. 1 the component VCCs are aggregated at the input to the VPC. A single aggregate queue stores the incoming component VCCs prior to the per-VC shaper which shapes traffic on the VPC. There is, however, no attempt to provide quality-of-service differentiating arbitration between the component VCC traffic.

Figure 3:
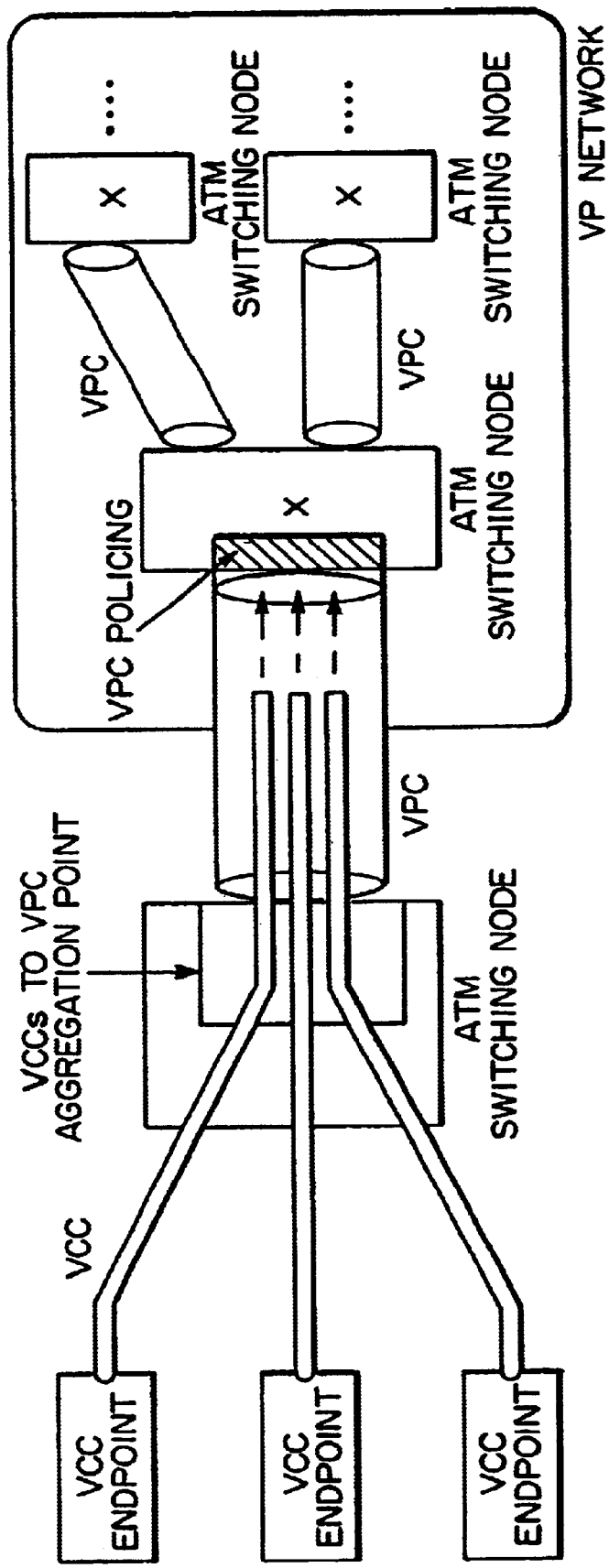
FIG. 3 is a block diagram of an ATM network with VPC aggregation.

The technique contemplated by the present invention provides VP aggregation shaping while maintaining per-VCC isolation amongst the aggregating VCCs. Such isolation makes it possible to maintain per-VC congestion control and quality of service differentiation on each individual component VCC. For the purpose of this description the terms "component" and "aggregating" are used interchangeably. They both denote the underlying VCCs which constitute a VPC. A network block diagram is shown in FIG. 3.

The ATM Forum has defined five service categories relating to ATM cell traffic. The five service categories are: constant bit rate (CBR), real time variable bit rate (rtVBR), non-real time variable bit rate (nrt-VBR), available bit rate (ABR) and unspecified bit rate (UBR). These categories can be divided into two main groups: real time (CBR and rt-vbr) and non-real time (nrt-VBR, ABR and UBR). For the real time service categories cell transfer delay (CTD) and cell delay variation (CDV) are both important quality of service (QoS) parameters. In light of these considerations the present invention relates to a hierarchical approach in which individual VCCs are logically grouped together with common service requirements. The technique for virtual path shaping according to the present invention is illustrated in FIG. 4.

Figure 4:
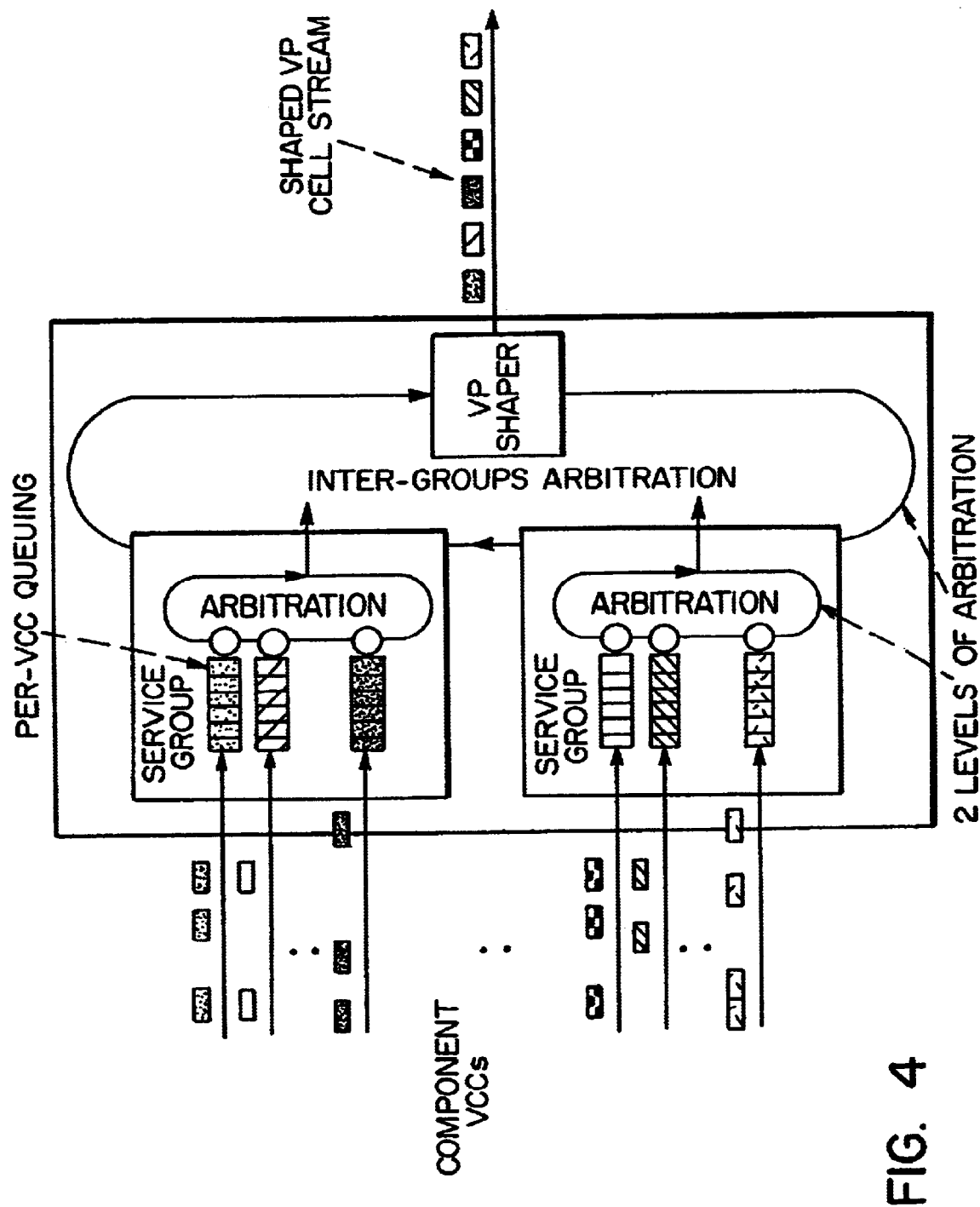
FIG. 4 illustrates the virtual path shaping technique of the present invention.

As shown in FIG. 4, each component VCC is individually queued in its respective per-VCC queue. As such any buffer management or congestion control technique can be applied to the isolated VCCs. This feature inherently allows better fairness as each connection's behaviour is isolated from one another. In view of the aforementioned definition of multiple service categories wherein each requires a different quality of service, the present invention addresses the relevant issue by introducing multiple arbitration hierarchies. The lowest level depicted in FIG. 4 is the service group level. All component VCCs within the same service group effectively share the same level of service as one unique arbitration technique is applied to all members of a particular service group. The arbitration can be, for example, a simple round-robin technique, an exhaustive round-robin technique, a weighted round-robin technique, a weighted fair queuing technique or any other scheduling technique. The arbitration choice is dependent on the performance and implementation complexity desired. For the best fairness performance a per-VC weighted fair queuing is used. This technique, however, incurs the highest level of implementation complexity.

After the VCCs have been arbitrated as between service groups the next hierarchical level is to arbitrate amongst all the service groups. As a potential application of this technique it is possible to map the five service categories defined by the ATM Forum into five separate service groups. Otherwise, it is possible to map the real time service categories into one group and the non-real time service categories into the other. The usage and partition of the service groups are considered to be implementation decisions. Depending on the desired level of complexity versus performance, it is possible to choose from the various arbitration techniques discussed previously. For instance, if the service groups are mapped into real time and non-real time service categories, the inter-group arbitration can be as simple as exhaustive servicing with the real time group having absolute priority over the non-real time group. This gives the real time group's connections better delay performance.

The two levels of arbitration determines the next cell which is to be transmitted and the shaper determines in the time domain when that cell can be emitted for the virtual path connection given certain traffic descriptors. These descriptors might include peak cell rate (PCR), sustained cell rate (SCR), and maximum burst size (MBS). Upon the determination that a cell can be emitted the inter-group's arbiter determines which service group is allowed to send and the chosen service group arbiter then further determines which component VCC should be served. Once the VCC is determined the cell at the head of that per-VCC queue is extracted and transmitted.

With this VP aggregation technique it is possible to achieve both VP shaping and controllability of underlying VCCs with an improved fairness performance amongst all the aggregating VCCs.

Figure 5:
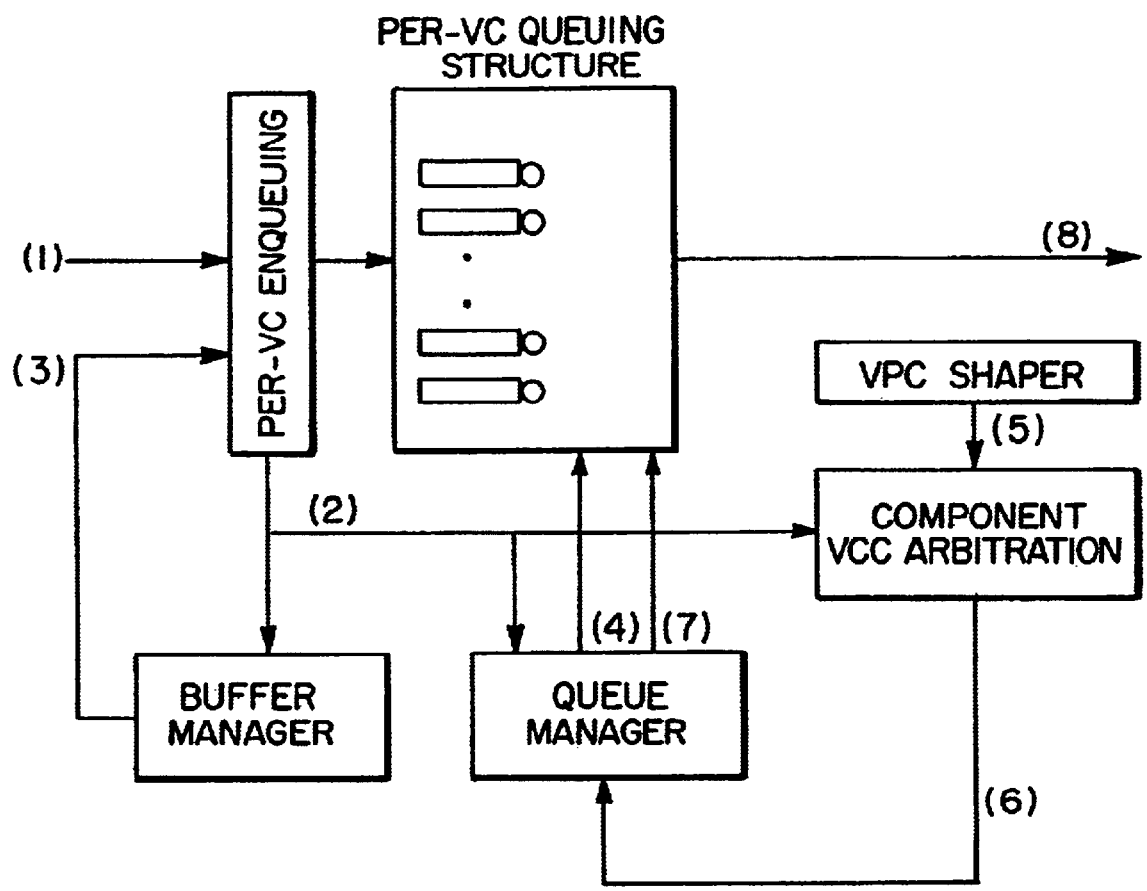
FIG. 5 is a functional block diagram of the vertical path shaping process.
Figure 6:
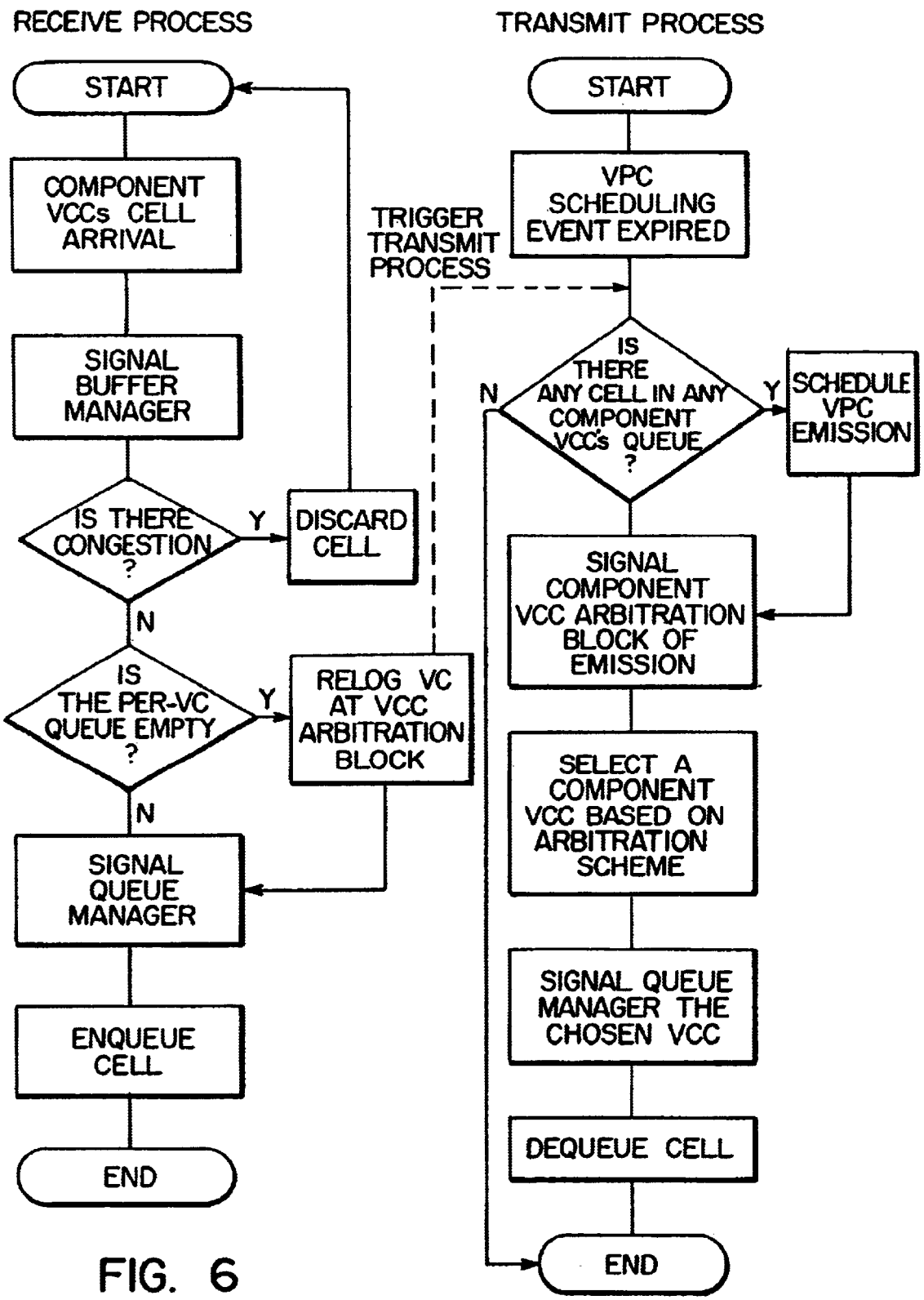
FIG. 6 is a flow diagram of the process depicted in FIG. 5.

FIGS. 5 and 6 provide, respectively, a function diagram and a flow diagram of the shaping process.

FIG. 5 sets out the following functional steps:

1) cell arrival event;

2) arrival notice;

3) discard decision based on current congestion condition;

4) queue manager determines the physical enqueuing location;

5) VPC shaper scheduling cell emission in time domain;

6) VCC arbitration block signals the chosen component VCC given a certain arbitration scheme;

7) queue manager dequeues the cell from the chosen component VCC; and 8) cell transmission FIG. 6 shows the steps in flow diagram format.

The system according to the present invention supports aggregation for all of the aforementioned service categories. An end-to-end VPC connection originates at an egress port (near-end node) and ends at an ingress port (far-end node). These ports or points are denoted VP Termination Points (VPTPs). Accordingly, a VPC aggregates at egress and segregates at ingress. The system support for VPCs pertains to its ability to shape and arbitrate amongst the aggregating connections. A description of an architectural model for arbitrating real-time service categories follows.

Figure 7:
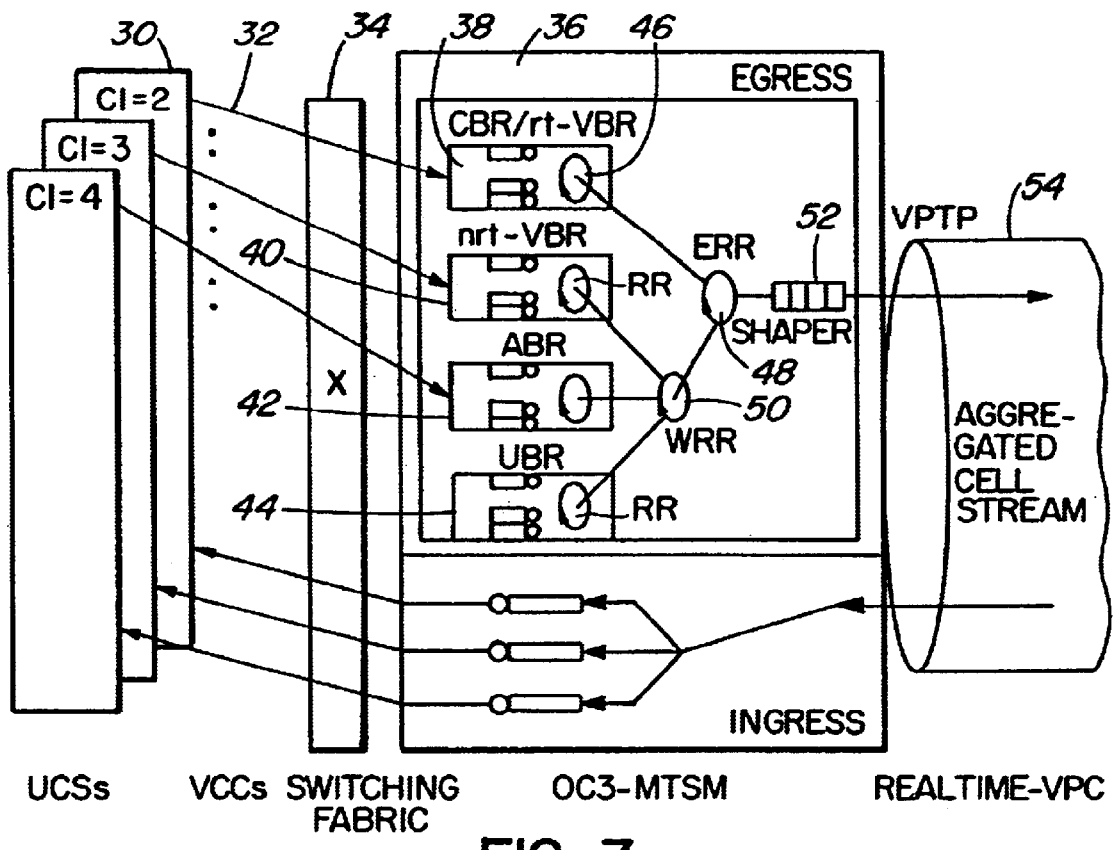
FIG. 7 illustrates one real time virtual path aggregation scheme.
Figure 8:
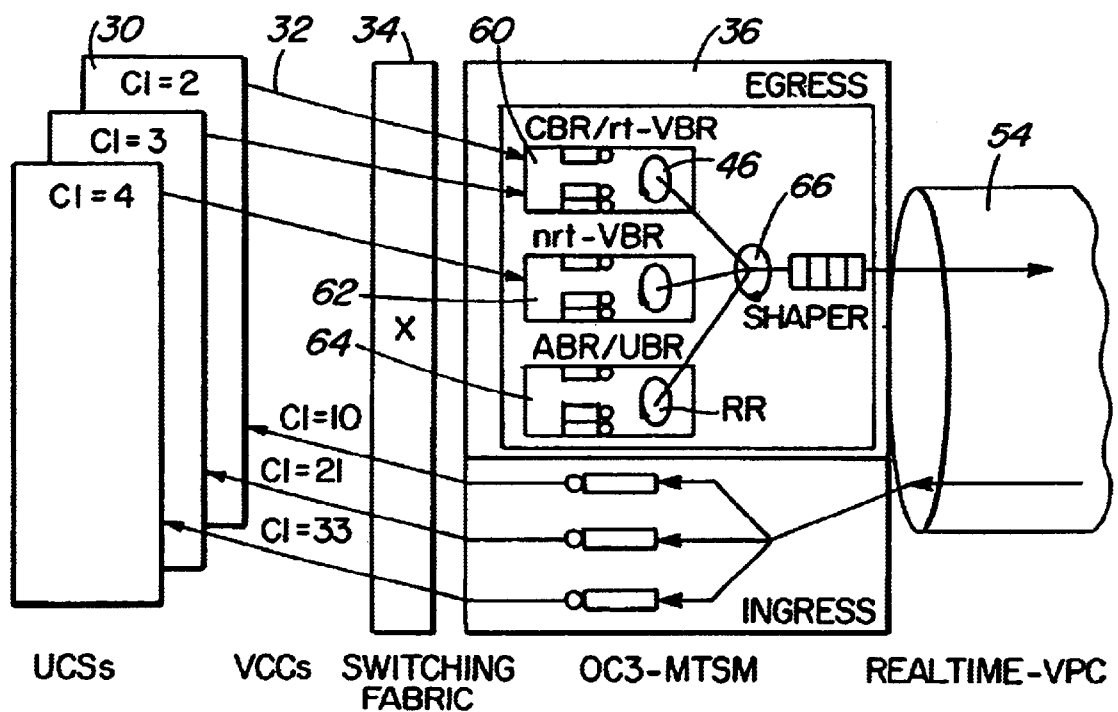
FIG. 8 illustrates an alternate aggregation scheme.

For real-time VPC aggregation in egress, the system supports aggregation of all five of the previously identified service categories. FIGS. 7 and 8 graphically illustrates two options for the handling of priorities within the aggregating VPTP.

The first option is shown in FIG. 7. As shown Universal Card Slots (UCSs) 30 are connected via VCCs 32 through the switching fabric 34 to the arbitration/shaper device 36 of this embodiment. Device 36 includes per-VC queues 38 (CBR/rt-VBR), 40 (nrt-VBR), 42 (ABR) and 44 (UBR). A round-robin (RR) arbitration scheme 46 is implemented within each VC group. Hierarchical arbitration as between service categories is implemented by Exhaustive Round Robin scheme 48 and Weighted Round Robin scheme 50 as will be discussed later. Temporal shaper 52 determines egress times of cells from respective queues to VPC 54.

In the egress direction, aggregating VCs are per-VC queued. CBR and rt-VBR categories of service are serviced exhaustively over all other service categories. These CBR and rt-VBR connections are serviced in a round-robin (RR) fashion amongst themselves. For non-real time (nrt) VBR, ABR and UBR connections, they are serviced in a weighted-round-robin (WRR) fashion. As in the real time case like-servicecategories connections are serviced in a simple round-robin fashion.

The reason for separating nrt-VBR, ABR and UBR with WRR is as follows: nrt-VBR is separated out so that sustainable cell rate (SCR0) and peak cell rate (PCR0 and PCR1) type shaping would not take up all the bandwidth if users choose to send cell loss priority (CLP1) cells. ABR and UBR are separated to have their own weight so that a simple explicit rate (ER) algorithm can be used and still achieve available bandwidth partitioning between ABR and UBR in both port and VPTP levels.

Given that usage of CLP1 traffic in VBR service category can be ignored taking into account usage of the ER algorithm, a simpler scheme for VPC aggregation can be implemented as shown in FIG. 8. As shown in FIG. 8 there are three groups of per-VC queues: CBR and rt-VBR 60, nrt-VBR 62, and ABR/UBR 64. These three groups are serviced in an exhaustive-round-robin fashion (66). Within each group, they are serviced with a simple round-robin (RR) scheme. The nrt-VBR traffic is isolated such that UBR traffic cannot overwhelm nrt-VBR connections.

The outgoing shaping priority and-characteristics are associated with the outgoing VPC's service category. With the per-VC queuing nature maintained, the buffer management strategy operates similarly with respect to other connection types (i.e. simple VCC, VPC switching connections) Discard algorithms such as early packet discard (EPD) work on a per-VC basis for these aggregating VCCs.

For non-real-time VPCs, all underlying traffic must be non-real-time. Therefore, there is no exhaustive-round-robin arbitration between the real-time group and the non-real-time group. The WRR scheme still applies to the aggregating non-real time VCC in the option of FIG. 7. For the option of FIG. 8 the CBR/rt-VBR group is simply removed-from the inter-group contention and the ERR scheme is replaced with WRR.

While particular embodiments of the invention have been disclosed and illustrated, it will be apparent to one skilled in the art that variations and alternatives can be implemented without departing from the basic concept of the invention. It is to be understood that such variations and alternatives, to the extent possible, fall within the scope of the invention as defined by the appended claims.

What is claimed is:

1. A device for aggregating a plurality of virtual connections into a single virtual connection, comprising:

an arbitrator to select a virtual connection from the plurality of virtual connection to be aggregated into the single virtual connection; and a shaper to determine in time domain when traffic from the selected virtual connection is to be emitted in accordance with descriptors associated with the single virtual connection.

2. A device as claimed in claim 1, wherein the arbitrator is a hierarchical arbitrator which firstly arbitrates amongst groupings of the plurality of virtual connections to select one virtual connection from each grouping and secondly arbitrates amongst the respective virtual connections selected from the groupings to select the virtual connection to be aggregated.

3. A device as claimed in claim 2, wherein the plurality of virtual connections are virtual channel connections and the single virtual connection is a virtual path connection.

4. A method of aggregating a plurality of virtual connections into a single virtual connection comprising:

selecting a virtual connection from the plurality of virtual connections to be aggregated into the single virtual connection; and determine, in time domain, when traffic from the selected virtual connection is to be emitted in accordance with descriptors associated with the single virtual connection.

5. The method as defined in claim 4 wherein said virtual connection is selected by a hierarchical arbitrator which firstly arbitrates amongst groupings.

6. The method according to claim 5 wherein the plurality of virtual connections are virtual channel connections and the single virtual connection is a virtual path connection.

* * * * *